(12) United States Patent
Chi-Hsueh et al.

(10) Patent No.: US 10,919,602 B2
(45) Date of Patent: Feb. 16, 2021

(54) PORTABLE MOTOR ASSEMBLY

(71) Applicants: Richard Chi-Hsueh, San Diego, CA (US); Chung-Yeh Hsu, New Taipei (TW); Yie-Yeh Hsu, New Taipei (TW)

(72) Inventors: Richard Chi-Hsueh, San Diego, CA (US); Chung-Yeh Hsu, New Taipei (TW)

(73) Assignees: Richard Chi-Hsueh, San Diego, CA (US); Chung-Yeh Hsu, New Taipei (TW); Yie-Yeh Hsu, New Taipei (TW)

( * ) Notice: Subject to any disclaimer, the term of this patent is extended or adjusted under 35 U.S.C. 154(b) by 287 days.

(21) Appl. No.: 16/212,993

(22) Filed: Dec. 7, 2018

(65) Prior Publication Data

US 2019/0176932 A1    Jun. 13, 2019

Related U.S. Application Data

(60) Provisional application No. 62/596,843, filed on Dec. 10, 2017.

(51) Int. Cl.
*B62M 6/75* (2010.01)
*H02K 7/116* (2006.01)
*B62M 6/45* (2010.01)
*B62M 13/04* (2006.01)

(52) U.S. Cl.
CPC ............... *B62M 6/75* (2013.01); *B62M 6/45* (2013.01); *B62M 13/04* (2013.01); *H02K 7/116* (2013.01)

(58) Field of Classification Search
CPC ........................................................ B62D 6/75
See application file for complete search history.

(56) References Cited

U.S. PATENT DOCUMENTS

| 3,878,910 | A | * | 4/1975 | Walker, Jr. | ............... B62M 6/75 180/220 |
| 5,778,998 | A | * | 7/1998 | Shih | ...................... B62M 13/00 180/221 |
| 6,102,148 | A | * | 8/2000 | Chien | ...................... B62M 6/75 180/220 |
| 2011/0232985 | A1 | * | 9/2011 | Lee | .......................... B62M 6/75 180/297 |

FOREIGN PATENT DOCUMENTS

| CN | 104709431 | A | * | 6/2015 | |
| CN | 106809335 | A | * | 6/2017 | |
| CN | 107089293 | A | * | 8/2017 | |
| CN | 108163129 | A | * | 6/2018 | |
| GB | 2559626 | A | * | 8/2018 | ............. B62K 3/002 |
| KR | 101018104 | B1 | * | 2/2011 | ............. B62M 6/75 |
| WO | WO-2015173660 | A1 | * | 11/2015 | ............. B62M 6/75 |

* cited by examiner

*Primary Examiner* — Kevin Hurley
(74) *Attorney, Agent, or Firm* — Rosenberg, Klein & Lee

(57) ABSTRACT

The present invention relates to a portable motor assembly comprising a case, a control module disposed in the case, a motor wrapped up with a friction wheel for connecting to the case and controlled by the control module for rotation, a fixing base connecting to a bottom of the case and having a clamp for fixing to a seat tube of a bicycle and at least one tension spring for pulling down the fixing base and making the friction wheel surrounding the motor tightly press against a surface of a rear wheel of the bicycle to drive a rear wheel of the bicycle.

10 Claims, 10 Drawing Sheets

US 10,919,602 B2

PORTABLE MOTOR ASSEMBLY

REFERENCE TO RELATED APPLICATION

This Application is based on Provisional Patent Application Ser. No. 62/596,843, filed 10 Dec. 2017, currently pending.

BACKGROUND OF THE INVENTION

1. Field of the Invention

The present invention relates to a portable motor assembly which is convenient for a user to carry and can be easily assembled to a bicycle to auxiliary rotate a rear wheel of the bicycle or disassembled from the bicycle so as to achieve an effect of labor-saving for a bicycle rider and improve its whole practical feature.

2. Description of Related Art

A bicycle rider has to step on pedals of a bicycle by feet to drive the bicycle moving forward, so riding bicycle has effect of fitness and the bicycle is considered as an excellent fitness equipment. Since riding a bicycle does not cost other kinds of fuel, effects of saving energy and protecting environment are achieved and the bicycle becomes a popular transportation tool in recent years. As the bicycle is chosen as a transportation tool by more and more people, a motor is installed on the bicycle for a bicycle rider who rides a medium distance or a long distance to save labor. The motor on the bicycle is connected to a battery therein for supplying electricity to turn on the motor, and the bicycle is then driven to move by the motor to reduce fatigue of the bicycle rider who rides a medium distance or a long distance.

Although the bicycle provided with the motor is convenient for the bicycle rider riding a medium distance and a long distance, the motor and the battery disposed on the bicycle are heavy which cause a burden to the bicycle rider who does not use the motor to drive the bicycle when riding and reduce the willingness of the bicycle rider to ride the bicycle. Furthermore, the motor is expensive and not convenient to storage when disposed on the bicycle so a bicycle theft is also increased. Therefore, a whole structure of the bicycle provided with the motor needs to be improved.

SUMMARY OF THE INVENTION

The present invention provides a portable motor assembly which is convenient for a user to carry and can be assembled to a bicycle to rotate a rear wheel of the bicycle or disassembled from the bicycle to achieve a labor-saving effect and improve its whole practical feature.

The present invention provides a portable motor assembly which has a case, a control module, a motor and a fixing base.

The case has a baseplate at a bottom and a first motor fixing rack.

The control module is disposed in the case and has a power supply unit, a motor driving module and a switch. The power supply unit is electrically connected to the control module for supplying electricity. The motor driving module is electrically connected to the control module. The switch is disposed outside the case for controlling an electricity supply of the power supply unit.

The motor has a motor axle having an axle holder, a friction wheel, a joint terminal and a signal terminal. The motor axle is pivotally connected to the axle holder by an outer end for connecting the first motor fixing rack of the case. The friction wheel surrounds an outer surface of the motor. The joint terminal and the signal terminal are disposed at an exit of the axle holder and are electrically connected to the motor driving module of the control module for controlling and driving the motor.

The fixing base has a supporting plate, a clamp holder, a clamp having a knob wrench, and at least one a tension spring seat having a tension spring. The supporting plate is connected to the baseplate of the case. The clamp holder is disposed at one side of the supporting plate opposite to the motor, and the clamp is connected to the clamp holder for clamping a seat tube of a bicycle. The at least one tension spring seat is disposed on the other side of the supporting plate for corresponding to the motor, and the tension is connected to the clamp holder and the tension spring seat.

Accordingly, when the clamp of the fixing base is clamped on the seat tube of the bicycle, the friction wheel covered on the outer surface of the motor is pressed tightly to contact a surface of a rear wheel of the bicycle and driving the rear wheel to rotate.

According to an embodiment of the present invention, the baseplate of the case is provided with plural first screw holes, and the supporting plate of the fixing base is provided with plural second screw holes corresponding to the plural first screw holes for correspondingly screwing to the plural first screw holes by plural locking members.

According to an embodiment of the present invention, the first motor fixing rack is disposed in the case for assembling to the axle holder of the motor, and a lower portion of the motor is protruded from the bottom of the case.

According to an embodiment of the present invention, the baseplate of the case is provided with a second motor fixing rack extended from a lower lateral region thereof, and the second motor fixing rack is provided with a supporting board disposed at a lateral for connecting to the axle holder of the motor.

According to an embodiment of the present invention, the motor is provided with a groove at an outer edge for correspondingly connecting the rear wheel of the bicycle for positioning.

According to an embodiment of the present invention, the motor is provided with a rotor base and a stator base. The rotor base has plural magnetic sheets arranged at an inner edge thereof and accommodating the motor axle in a central region thereof. The stator base is disposed inside the rotor base for insertion of the motor axle and has plural silicon steel sheets at an outer edge and plural coils winding on the plural silicon steel sheets. The motor axle has a first bearing, a transmission gear sleeved on the first bearing and having an outer rim. An epicyclic gearing housing has plural inner gears for correspondingly engaging with the outer rim of the transmission gear and a ring gear sleeved by the epicyclic gearing housing and engaged with the plural inner gears, and a motor cap covered on the epicyclic gearing housing and having at least one screw member for fixation. The epicyclic gearing housing is provided with a second bearing disposed between the stator base and the epicyclic gearing housing, plural latches pivotally connected to the epicyclic gearing housing for positioning the plural inner gears, a third bearing sleeved at an outer rim thereof, and a C-shaped circlip for buckling the third bearing on the epicyclic gearing housing.

According to an embodiment of the present invention, the control module is electrically connected with a charging module, a charging socket and an electricity indicator lamp. The charging socket is used to charge the power supply unit by an external power source and the charging module, and the electricity indicator lamp is used to show a charging status of the power supply unit.

According to an embodiment of the present invention, the friction wheel on the outer surface of the motor is made of rubber or polyurethane.

According to an embodiment of the present invention, the control module is electrically connected with a wireless module and a remote control. The remote control comprises a fixing ring, a main body and a wireless transmission element. The fixing ring is fixed to a handlebar of the bicycle, the main body is disposed on the fixing ring, and the wireless transmission element is disposed in the main body for correspondingly connecting the wireless module for connecting the remote control to the wireless module of the control module. The wireless module and the wireless transmission element are communicated by Bluetooth network, WiFi network, infrared radiation, ZigBee network, ANT network, or radio frequency identification (RFID) technology. The main body is further provided with a switch-on button, a speed control button, a speed display element, an electricity display module and a charging slot. The switch-on button is used for turning on main body and connecting the control module. The speed control button controls a rotating speed of the motor by the motor driving module of the control module. The speed display element shows the rotating speed of the motor, and the electricity indicator element shows the amount of power stored in the power supply unit. The charging slot is provided for charging a built-in battery in the main body by an external power source. According to an embodiment of the present invention, the wireless module of the control module or the wireless transmission element of the remote control is pre-logged with an identification data for discrimination and determination in connection to each other for preventing a wrong action caused by other interfering signals.

DETAILED DESCRIPTION OF THE PREFERRED EMBODIMENT

To provide a thorough understanding, the purpose and advantages of the present invention will be described in detail with reference to the accompanying drawings.

Figure 1:
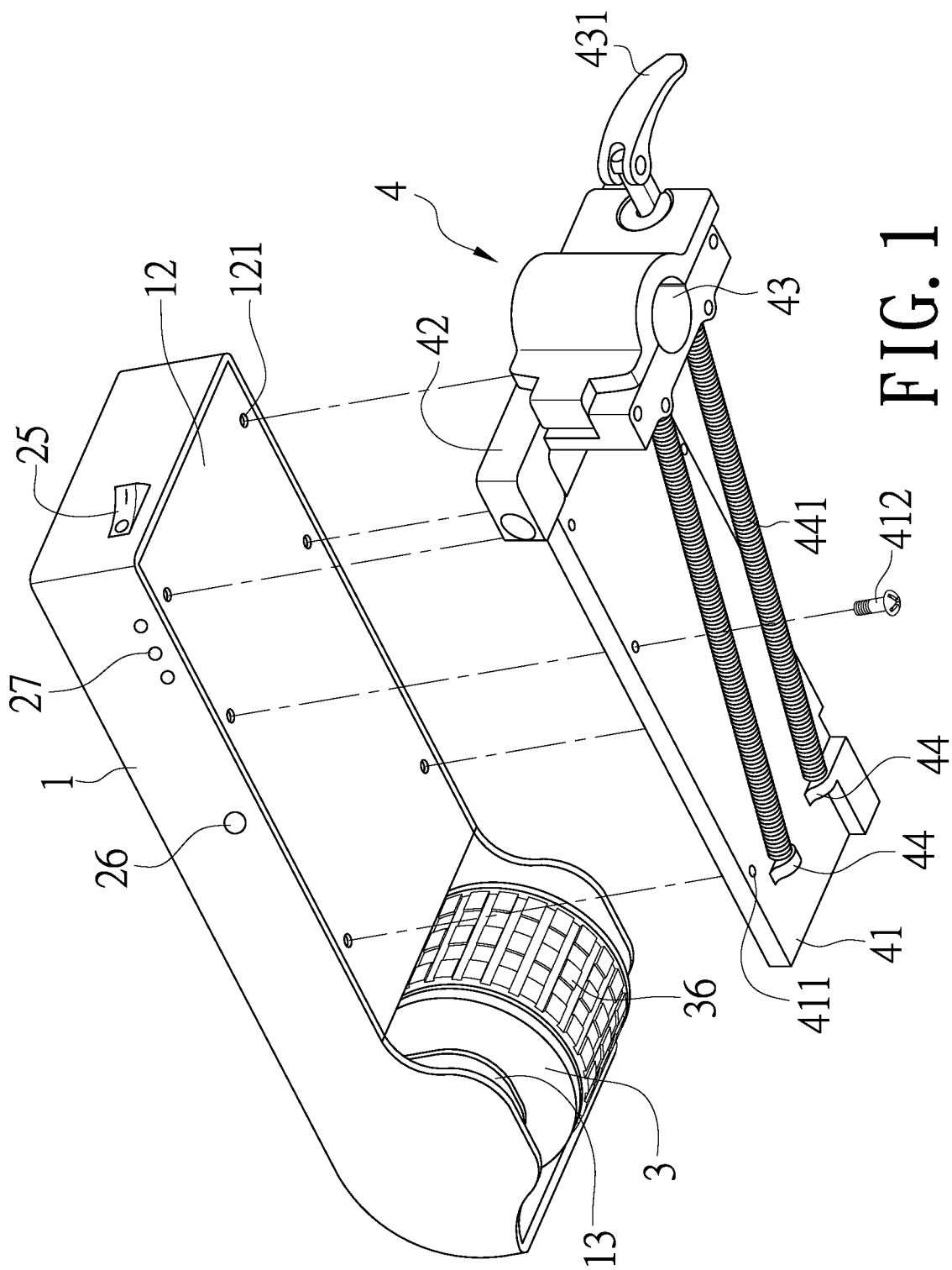
FIG. 1 is an exploded diagram showing a portable motor assembly of the present invention.
Figure 2:
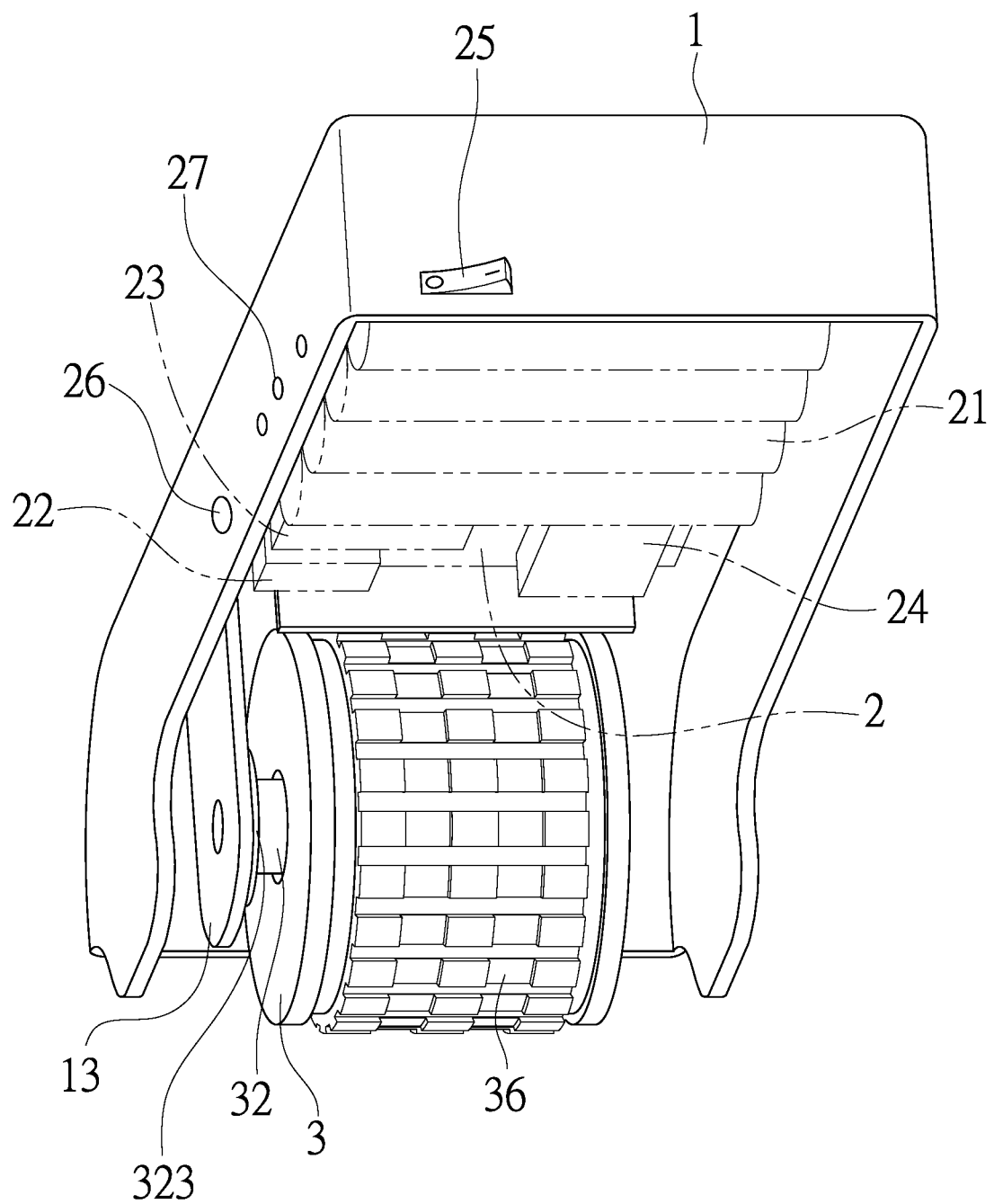
FIG. 2 is a partial stereogram showing a portable motor assembly of the present invention.
Figure 3:
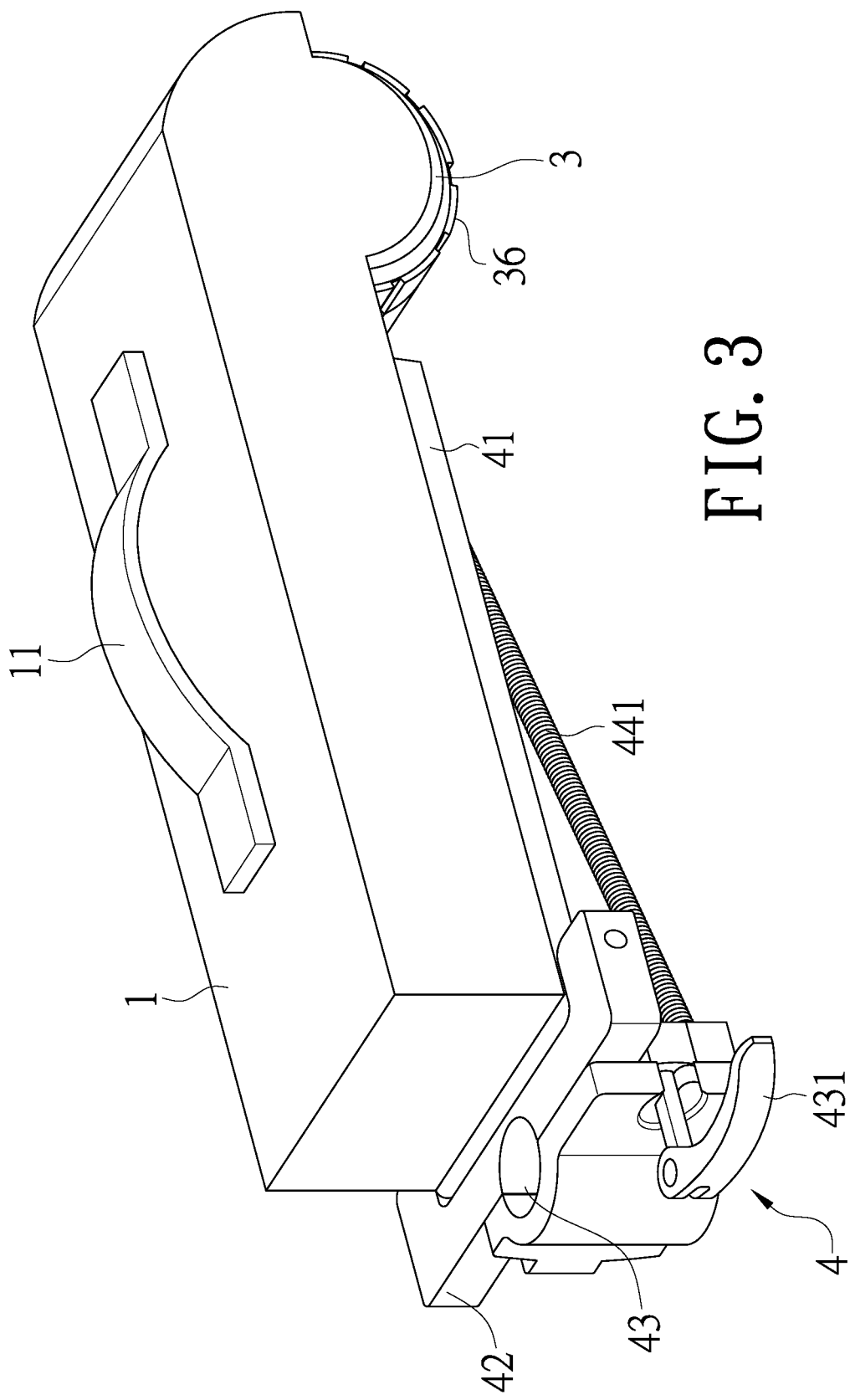
FIG. 3 is a stereogram showing a first embodiment for a portable motor assembly of the present invention in assembly.
Figure 4:
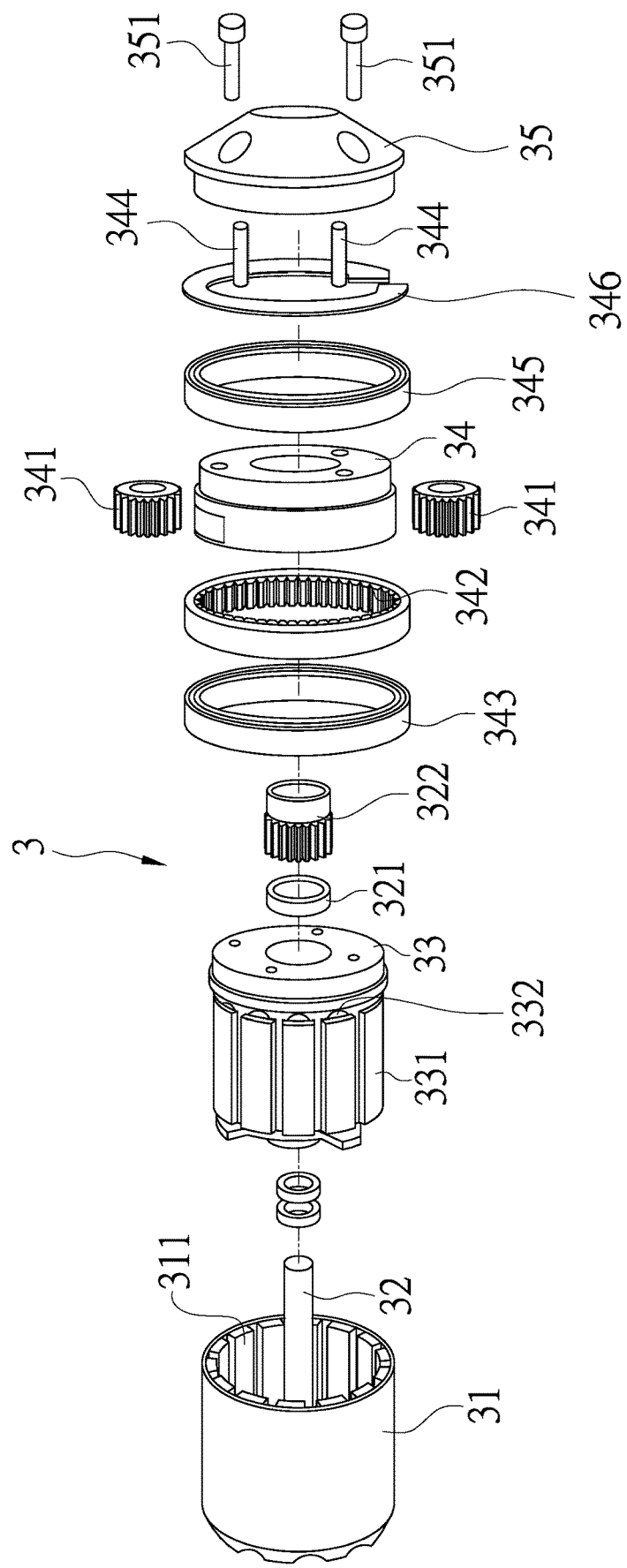
FIG. 4 is an exploded diagram showing a motor of the present invention.
Figure 5:
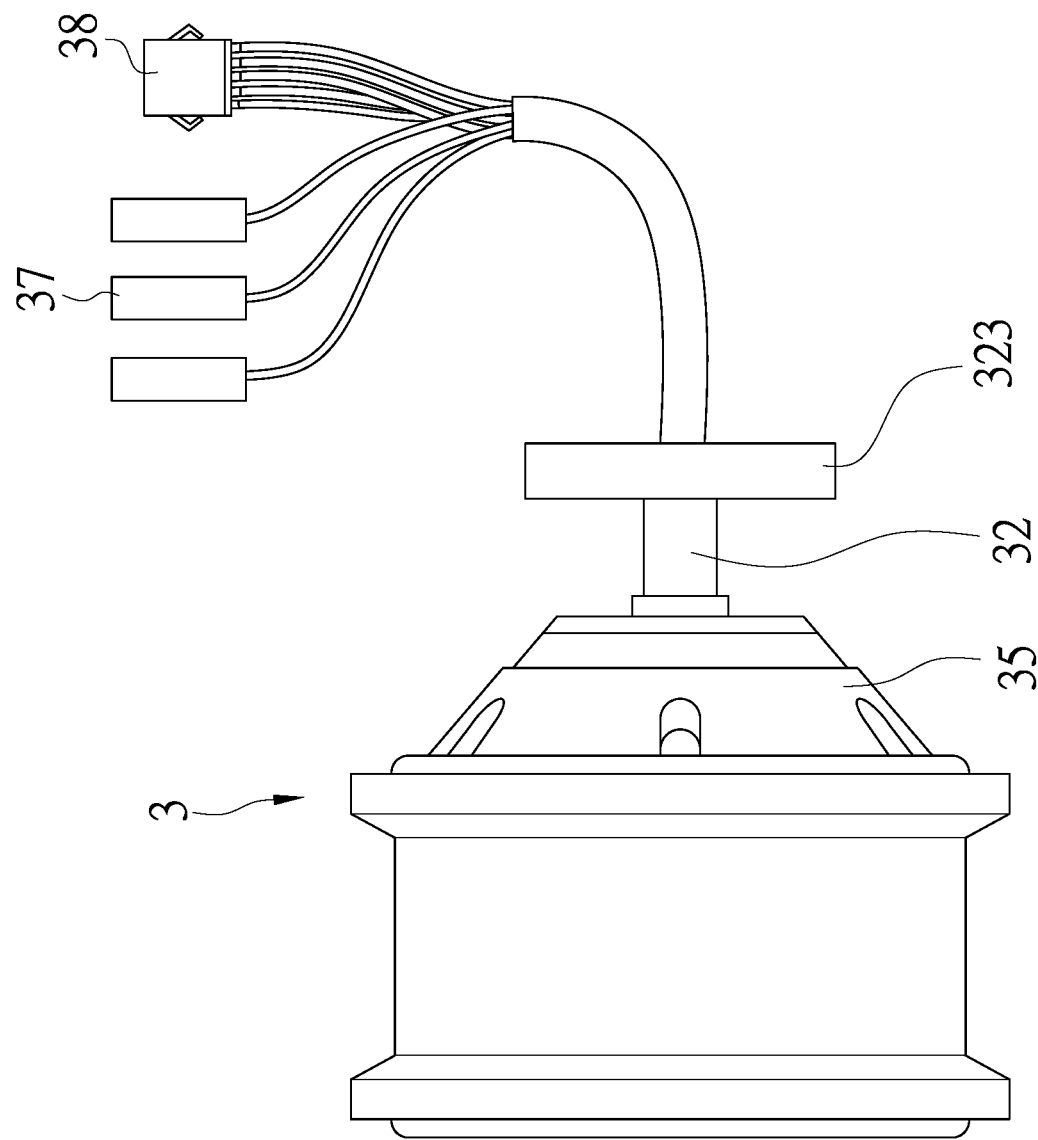
FIG. 5 is a schematic diagram showing a motor of the present invention in assembly.

Referring to FIG. 1, FIG. 2 and FIG. 3 which are an exploded diagram, a partial stereogram and a stereogram of the present invention, the present invention comprises a case (1), a control module (2), a motor (3) and a fixing base (4).

The case (1) has a handle (11) at a top region, a baseplate (12) at a bottom of the case (1) and a first motor fixing rack (13) in the case (1). The baseplate (12) is provided with plural first screw holes (121).

The control module (2) can be a microprocessor, a microcontroller, a digital signal processor, a logic circuit, an analog circuit, or a digital circuit. The control module (2) is disposed in the case (1) and electrically connected with a power supply unit (21) for supplying electricity, a wireless module (22), a charging module (23) and a motor driving module (24). The wireless module (22) is a Bluetooth network, WiFi network, infrared radiation, ZigBee network, ANT network, or radio frequency identification (RFID) technology. The control module (2) is further provided with a switch (25), a charging socket (26) and an electricity indicator lamp (27) outside the case (1). The switch (25) controls electricity supply of the power supply unit (21). The charging socket (26) is used for charging the power supply unit (21) by the charging module (23) from an external power source. The electricity indicator lamp (27) shows a charging status of the power supply unit (21).

Referring to FIG. 1 to FIG. 5, the motor (3) is provided with a rotor base (31), a motor axle (32), a stator base (33), an epicyclic gearing housing (34), a motor cap (35) and a friction wheel (36). The rotor base (31) has plural magnetic sheets (311) arranged at an inner edge of the rotor base (31). The motor axle (32) comprises a first bearing (321), a transmission gear (322) sleeved on the first bearing (321) and is accommodated in a central region of the rotor base (31). The stator base (33) has plural silicon steel sheets (331) sheets at an outer edge and is disposed inside the rotor base (31) for an insertion of the motor axle (32). The plural silicon steel sheets (331) are winded by plural coils (332). The transmission gear (322) has an outer rim, and the epicyclic gearing housing (34) has plural inner gears (341) for correspondingly engaging with the outer rim of the transmission gear (332). The epicyclic gearing housing (34) has a ring gear (342) which is sleeved by the epicyclic gearing housing (34) and engaged with the plural inner gears (341). The epicyclic gearing housing (34) is further provided with a second bearing (343), plural latches (344), a third bearing (345) and a C-shaped circlip (346). The second bearing (343) is disposed between the stator base (33) and the epicyclic gearing housing (34), and the plural latches (344) are pivotally connected to the epicyclic gearing housing (34) for positioning the plural inner gears (341). The third bearing (345) is sleeved at an outer rim of the epicyclic gearing housing (34), and the C-shaped circlip (346) is used to buckle the third bearing (345) on the epicyclic gearing housing (34). A motor cap (35) is covered on the epicyclic gearing housing (34) and fixed to the epicyclic gearing housing (34) by at least one screw member (351). The motor axle (32) is pivotally connected to an axle holder (323) by an outer end for connecting the axle holder (323) of the motor (3) to the first motor fixing rack (13) of the case (1). The first motor fixing rack (13) is disposed in the case (1) for assembling to the axle holder (323) of the motor (3), and a lower portion of the motor (3) is protruded from the bottom of the case (1). The friction wheel (36) is wrapped around an outer surface of the motor (3) and can be made of a rubber or polyurethane. An exit of the axle holder (323) of the motor (3) is provided with a joint terminal (37) and a signal terminal (38). The joint terminal (37) and the signal terminal

(38) are electrically connected to the motor driving module (24) of the control module (2) for controlling and driving the motor (3).

The fixing base (4) has a supporting plate (41), a clamp holder (42), a clamp (43) and at least one tension spring seat (44). The supporting plate (41) is provided with plural second screw holes (411) corresponding to the plural first screw holes (121) of the baseplate (12) of the case (1) for correspondingly screwing to the plural first screw holes (121) by plural locking member (412) and connecting the supporting plate (41) to the base plate (12). The clamp holder (42) is disposed at one side of the supporting plate (41) opposite to the motor (3) and connected to the clamp (43). The clamp (43) has a knob wrench (431) for controlling a clamping force exerted to the clamp (43). The at least one tension spring seat (44) is disposed on the other side of the supporting plate (41) for corresponding to the motor (3), and has a tension spring (441) for connecting the clamp holder (42) and the tension spring seat (44).

Figure 6:
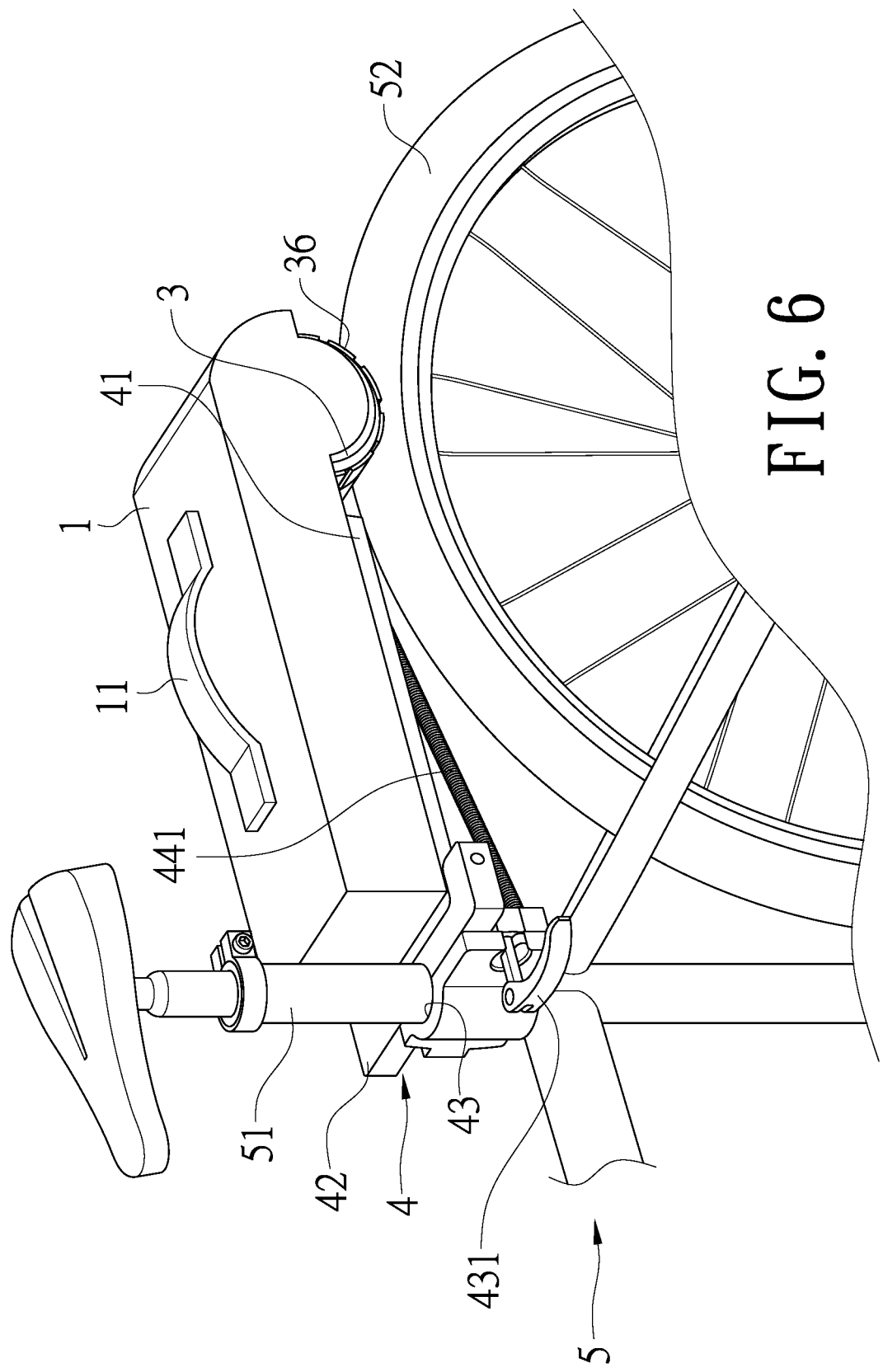
FIG. 6 is a schematic diagram showing a portable motor assembly of the present invention in use.
Figure 7:
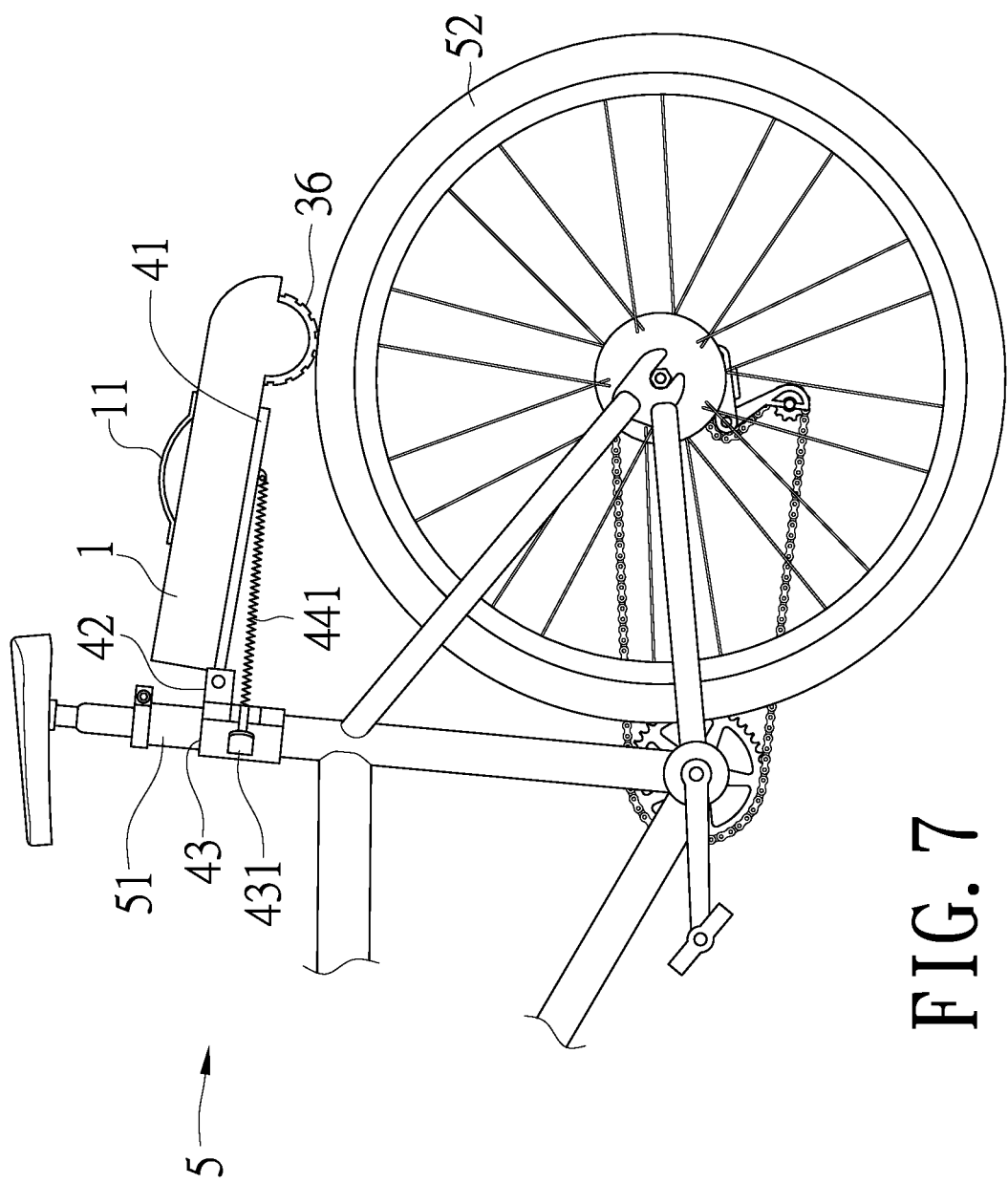
FIG. 7 is a side view showing a portable motor assembly of the present invention in use.

Referring to FIG. 6 and FIG. 7, when the present invention is assembled to a bicycle (5), the clamp (43) of the fixing base (4) clamps on a seat tube (51) of the bicycle (5), and the knob wrench (431) is rotated for tightly fastening the clamp (43) to the seat tube (51). The tension spring (441) disposed between the clamp holder (42) and the tension spring seat (44) provides a force to pull down the supporting base (41) and the baseplate (12) of the case (1). So, the friction wheel (36) wrapped on the surface of the motor (3) and protruding from the bottom of the case (1) is tightly contacted a surface of a rear wheel (52) of the bicycle (5) for driving the rear wheel (52) to rotate.

Figure 8:
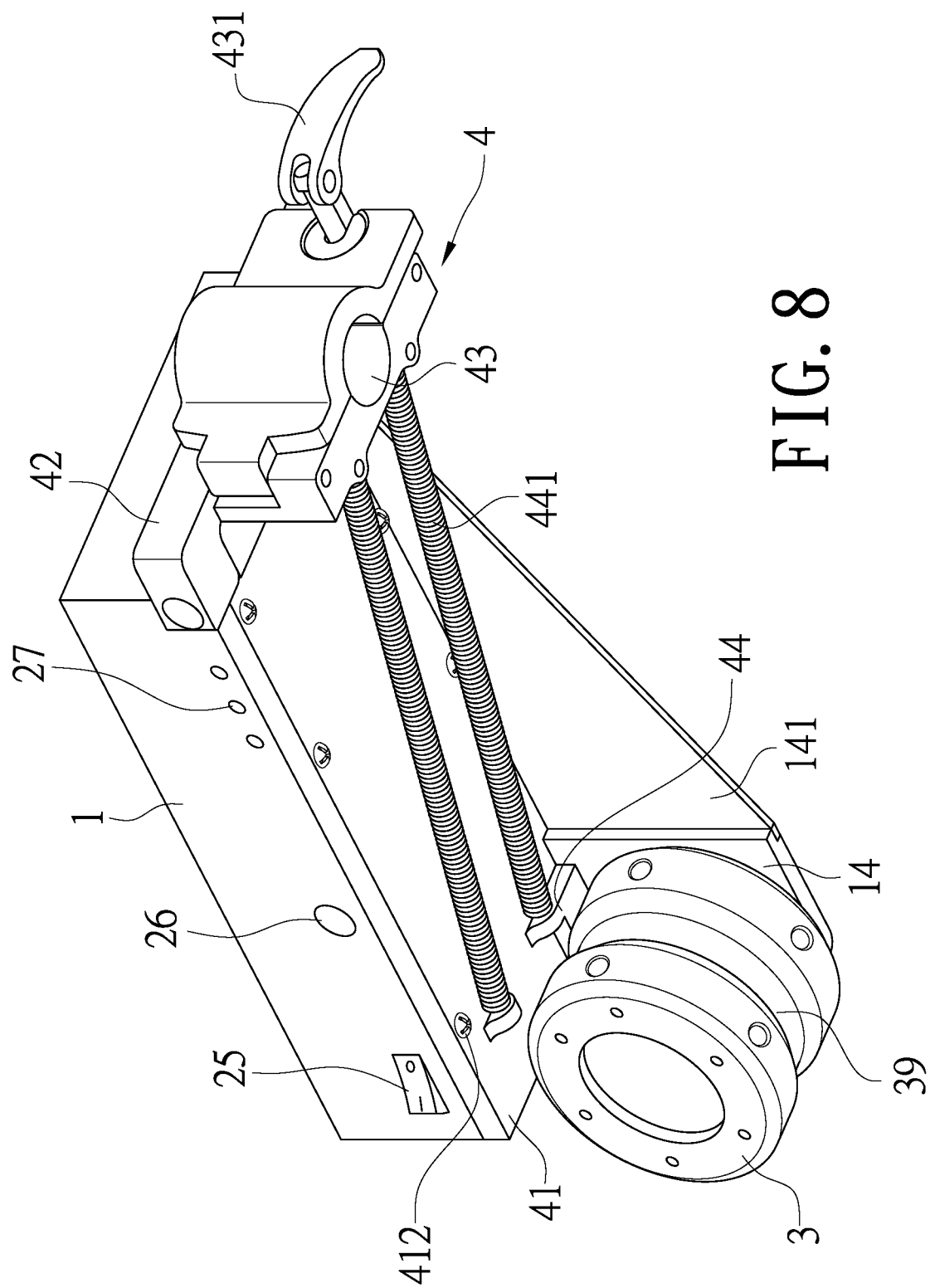
FIG. 8 is a stereogram showing a second embodiment for a portable motor assembly of the present invention in assembly.

Referring to FIG. 8, in second embodiment of the present invention, the baseplate (12) of the case (1) is provided with a second motor fixing rack (14) extended from a lower lateral region thereof. The second motor fixing rack (14) is provided with a supporting board (141) disposed at a lateral for connecting to the axle holder (323) of the motor (3). The motor (3) is further provided with a groove (39) at an outer edge for correspondingly contacting the rear wheel (52) of the bicycle (5) for positioning.

Figure 9:
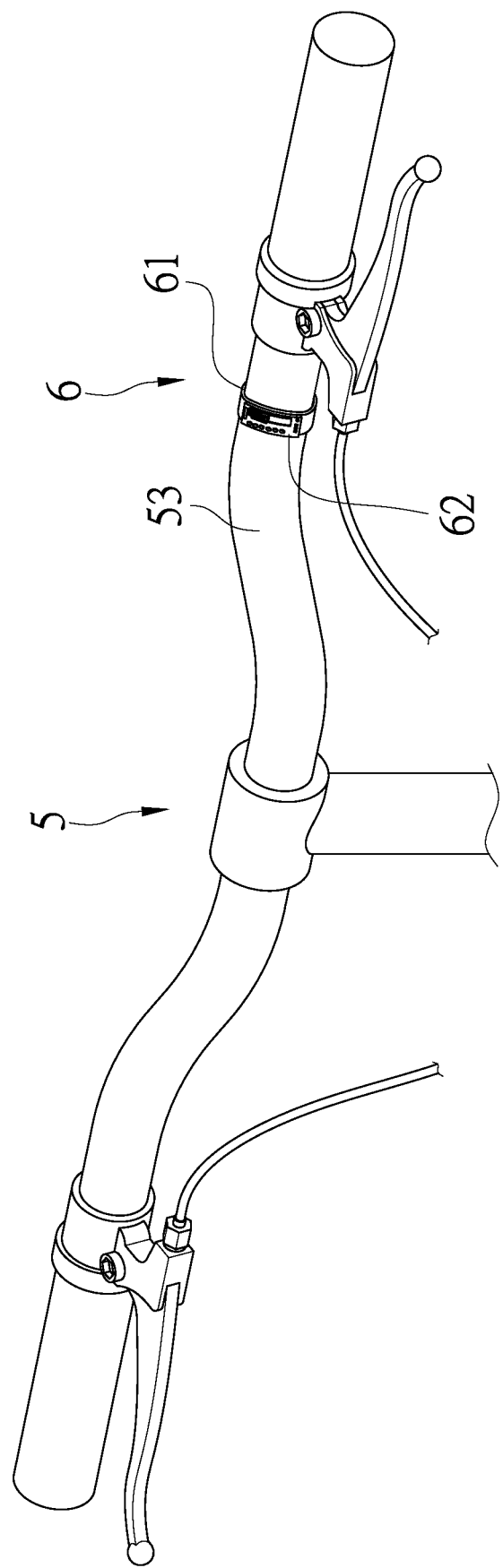
FIG. 9 is a stereogram showing a remote control of the present invention assembled to a bicycle.
Figure 10:
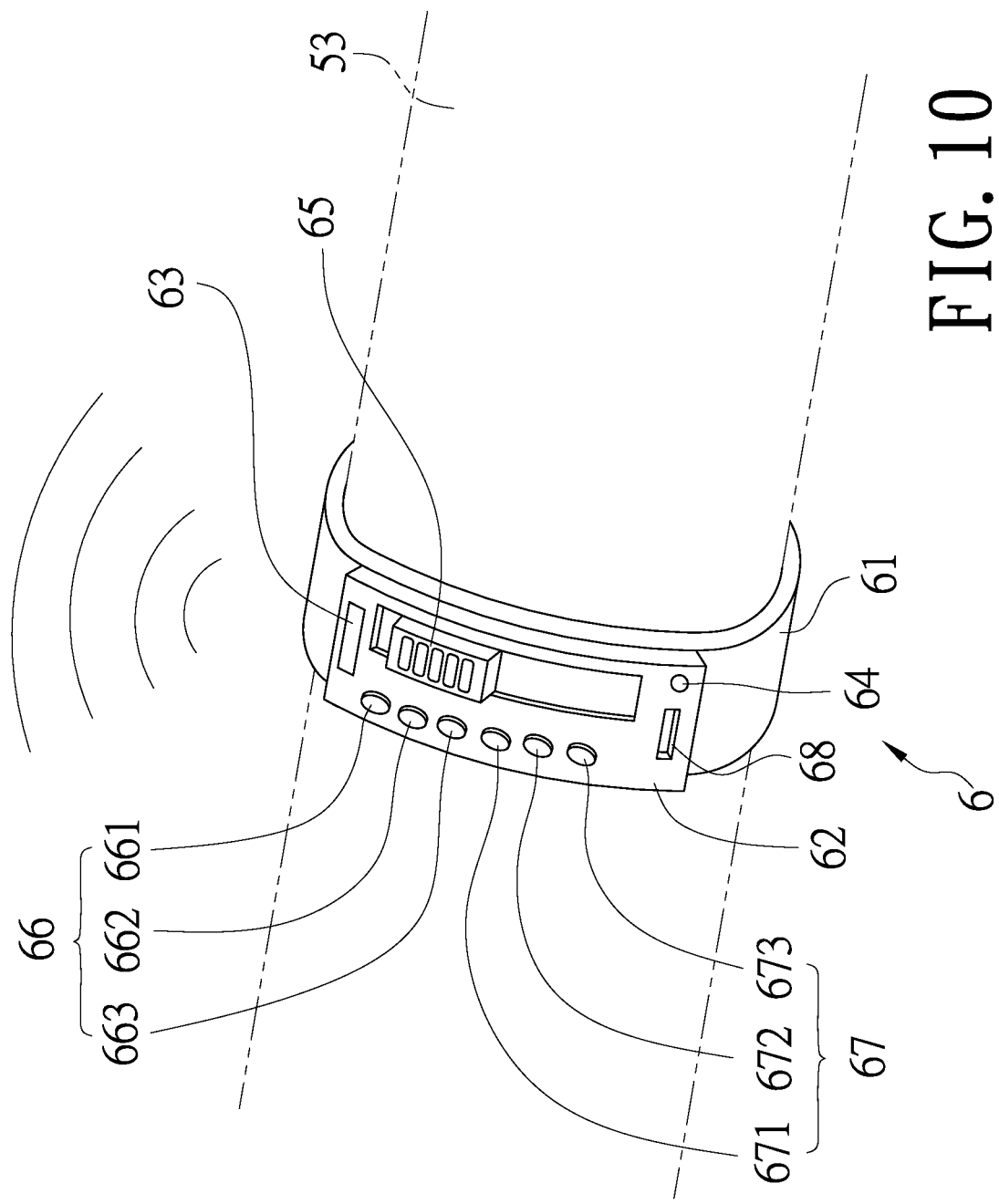
FIG. 10 is schematic diagram showing a remote control of the present invention.

Referring to FIG. 9 and FIG. 10, the present invention further comprises a remote control (6). The remote control (6) comprises a fixing ring (61) fixed to a handlebar (53) of the bicycle (5), a main body (62) disposed on the fixing ring (61), a wireless transmission element (63) disposed in the main body (62) for correspondingly connecting the wireless module (22) of the control module (2) by Bluetooth network, WiFi network, infrared radiation, ZigBee network, ANT network, or radio frequency identification (RFID) technology. In addition, the main body (62) is further provided with a switch-on button (64), a speed control button (65), a speed display element (66), an electricity indicator element (67) and a charging slot (68). The switch-on button (64) turns on the power and is connected the control module (2). The speed control button (65) a rotating speed of the motor (3) by the motor driving module (24) of the control module (2). The speed display element (66) is a liquid crystal display (LCD) monitor or a speed indicator set containing a high-speed indicator (661), a medium-speed indicator (662), and a low-speed indicator (663) for showing the rotating speed of the motor (3). The electricity indicator element (67) is a LCD monitor or a power indicator lamp set containing a full power indicator lamp (671), a middle power indicator lamp (672) and a low power indicator lamp (673) for displaying the amount of power stored in the power supply unit (21). The charging slot (68) used to charge a built-in battery in the main body (62) by an external power source.

Moreover, the wireless module (22) of the control module (2) or the wireless transmission element (63) of the remote control (6) is pre-logged with an identification data such as an identifier for discrimination and determination in connection to each other for preventing a wrong action caused by other interfering signals and increasing a safety in use.

In summary, when using the present invention, the remote control (6) is connected to the control module (2) to actuate the motor (3) to rotate by the control module (22). When the motor (3) is rotated, the friction wheel (36) wrapped on the surface of the motor (3) and the rear wheel (52) of the bicycle (5) are rubbing against each other since the friction wheel (36) is tightly contacted to the surface of the rear wheel (52), and the rear wheel (52) is driven to rotate by the friction wheel (36) to auxiliary drive the bicycle (5) to move.

Accordingly, the portable motor assembly of the present invention is convenient for a user to carry and can be easily assembled to a bicycle to auxiliary rotate a rear wheel of the bicycle or disassembled from the bicycle so as to achieve an effect of labor-saving for a bicycle rider and improve its whole practical feature.

What is claimed is:

1. A portable motor assembly, comprising:
a case having a baseplate at a bottom thereof and a first motor fixing rack;
a control module disposed in the case and electrically connected with a power supply unit for supplying electricity, a motor driving module, and a switch disposed outside the case for controlling electricity supply of the power supply unit;
a motor having a motor axle, an axle holder pivotally connected to an outer end of the motor axle for connecting the first motor fixing rack of the case, a friction wheel wrapped around an outer surface of the motor for tightly contacting a surface of a rear wheel of a bicycle and driving the rear wheel to rotate, and a joint terminal and a signal terminal disposed at an exit of the axle holder, wherein the joint terminal and the signal terminal are electrically connected to the motor driving module of the control module for controlling and driving the motor; and
a fixing base having a supporting plate for connecting the baseplate of the case, a clamp holder disposed at one side of the supporting plate opposite to the motor, a clamp connected to the clamp holder for clamping a seat tube of the bicycle, and at least one tension spring seat disposed on the other side of the supporting plate for corresponding to the motor, wherein the clamp has a knob wrench for controlling a clamping force exerted to the clamp, and the at least one tension spring seat has a tension spring for connecting the clamp holder and the tension spring seat.

2. The portable motor assembly as claimed in claim 1, wherein the baseplate of the case is provided with plural first screw holes, and the supporting plate of the fixing base is provided with plural second screw holes corresponding to the plural first screw holes for correspondingly screwing to the plural first screw holes by plural locking members.

3. The portable motor assembly as claimed in claim 1, wherein the first motor fixing rack is disposed in the case for assembling to the axle holder of the motor, and a lower portion of the motor is protruded from the bottom of the case.

4. The portable motor assembly as claimed in claim 1, wherein the baseplate of the case is provided with a second motor fixing rack extended from a lower lateral region thereof and wherein the second motor fixing rack is provided with a supporting board disposed at a lateral for connecting to the axle holder of the motor.

5. The portable motor assembly as claimed in claim 1, wherein the motor is provided with a groove at an outer edge for correspondingly contacting the rear wheel of the bicycle for positioning.

6. The portable motor assembly as claimed in claim 1, wherein the motor is provided with a rotor base having plural magnetic sheets arranged at an inner edge thereof and accommodating the motor axle in a central region thereof, the motor axle having a first bearing, a transmission gear sleeved on the first bearing and having an outer rim, a stator base disposed inside the rotor base for an insertion of the motor axle and having plural silicon steel sheets at an outer edge and plural coils winding on the plural silicon steel sheets, an epicyclic gearing housing having plural inner gears for correspondingly engaging with the outer rim of the transmission gear and a ring gear sleeved by the epicyclic gearing housing and engaged with the plural inner gears, and a motor cap covered on the epicyclic gearing housing and having at least one screw member for fixation, wherein the epicyclic gearing housing is provided with a second bearing disposed between the stator base and the epicyclic gearing housing, plural latches pivotally connected to the epicyclic gearing housing for positioning the plural inner gears, a third bearing sleeved at an outer rim thereof, and a C-shaped circlip for buckling the third bearing on the epicyclic gearing housing.

7. The portable motor assembly as claimed in claim 1, wherein the control module is electrically connected with a charging module, a charging socket for charging the power supply unit by the charging module from an external power source, and an electricity indicator lamp for showing a charging status of the power supply unit.

8. The portable motor assembly as claimed in claim 1, the friction wheel on the outer surface of the motor is made of rubber or polyurethane.

9. The portable motor assembly as claimed in claim 1, wherein the control module is electrically connected with a wireless module and a remote control, and wherein the remote control comprises a fixing ring fixed to a handlebar of the bicycle, a main body disposed on the fixing ring, a wireless transmission element disposed in the main body for correspondingly connecting the wireless module by Bluetooth network, WiFi network, infrared radiation, ZigBee network, ANT network, or radio frequency identification (RFID) technology, a switch-on button for turning on the power and connecting the control module, a speed control button for controlling a rotating speed of the motor by the motor driving module of the control module, a speed display element for showing the rotating speed of the motor, an electricity indicator element for displaying the amount of power stored in the power supply unit, and a charging slot for charging a built-in battery in the main body by an external power source.

10. The portable motor assembly as claimed in claim 9, wherein the wireless module of the control module or the wireless transmission element of the remote control is pre-logged with an identification data for discrimination and determination in connection to each other for preventing a wrong action caused by other interfering signals.

\* \* \* \* \*